Dec. 4, 1934.  A. O. MOE  1,983,478
METHOD OF AND APPARATUS FOR CLEANING FRUIT
Original Filed March 24, 1928    4 Sheets-Sheet 1
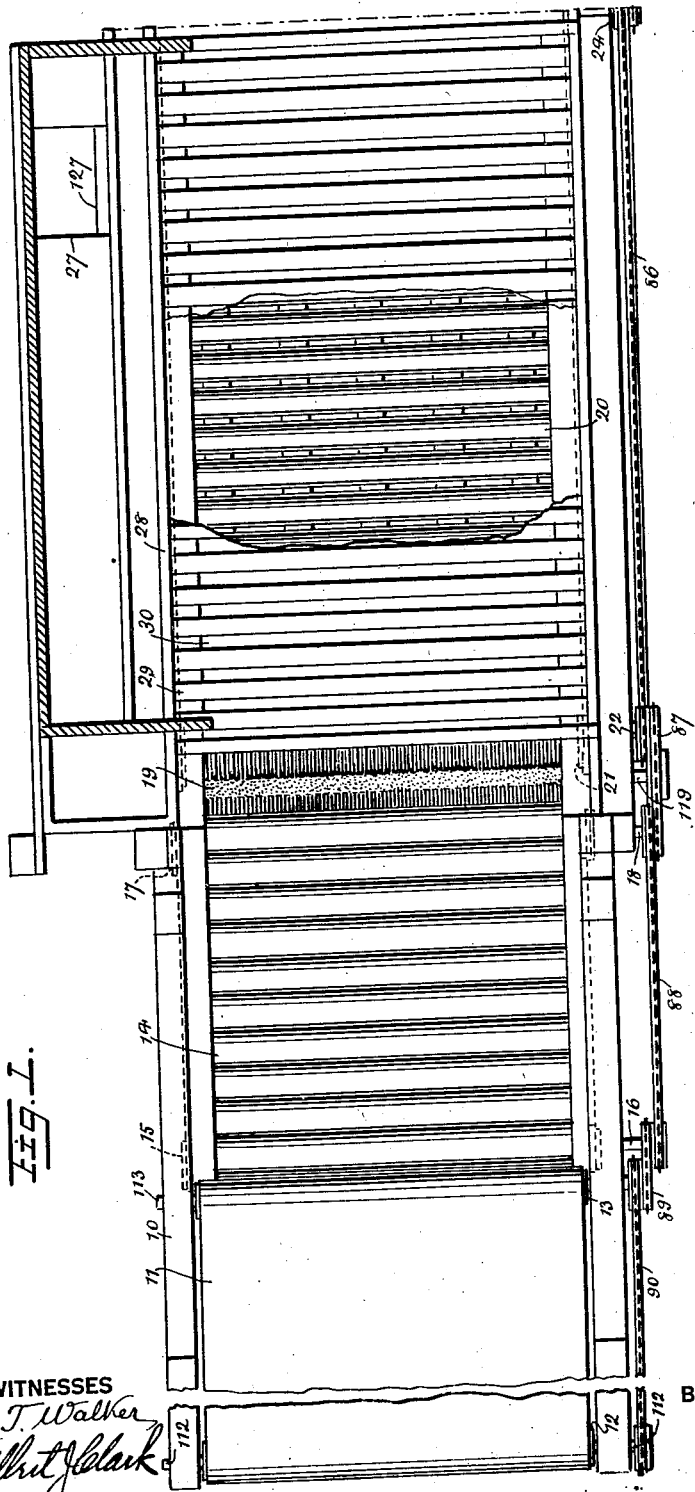
INVENTOR
ANDREW O. MOE
BY
ATTORNEYS
WITNESSES Dec. 4, 1934.  A. O. MOE  1,983,478
METHOD OF AND APPARATUS FOR CLEANING FRUIT
Original Filed March 24, 1928  4 Sheets-Sheet 2
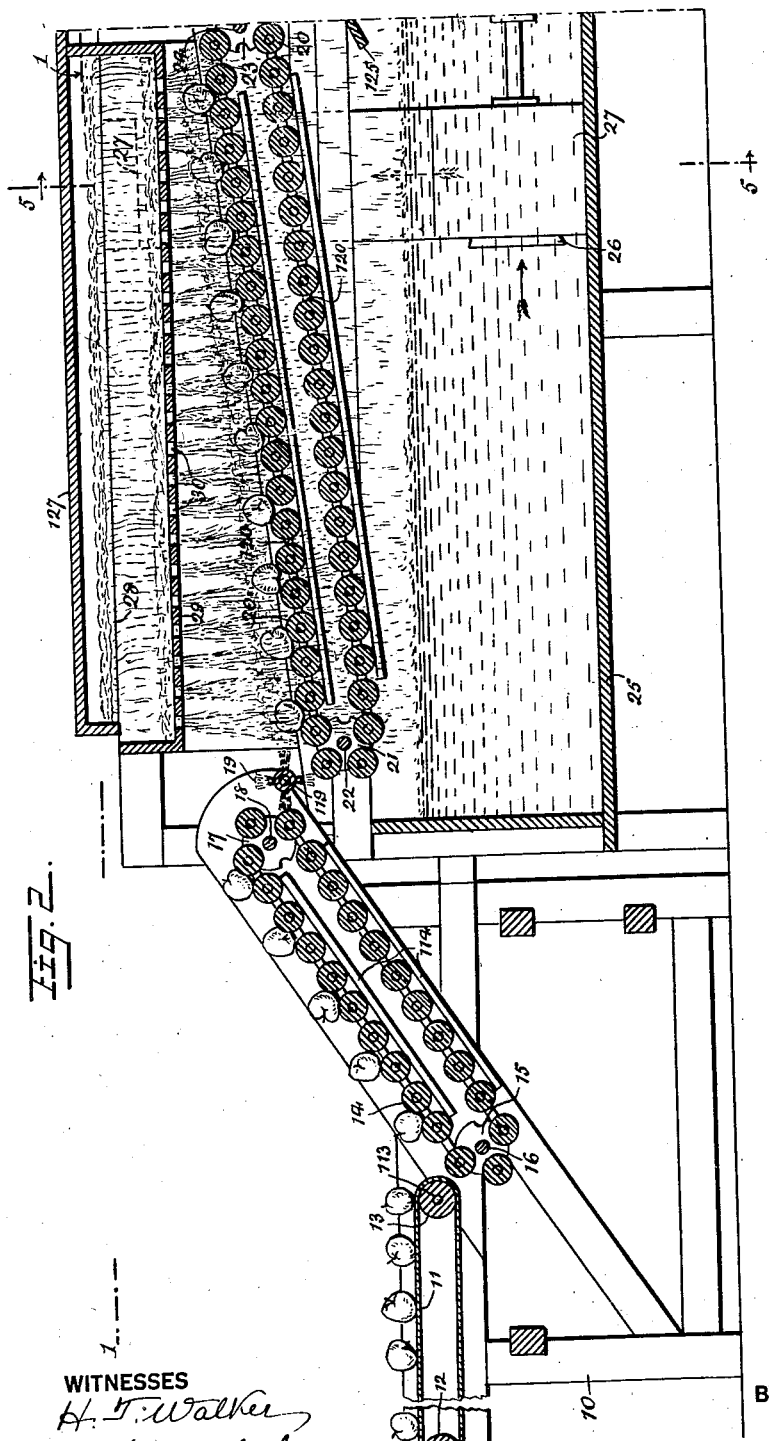
WITNESSES
H. T. Walker
Albert J. Clark
INVENTOR
Andrew O. Moe
BY
Munn & Co
ATTORNEYS

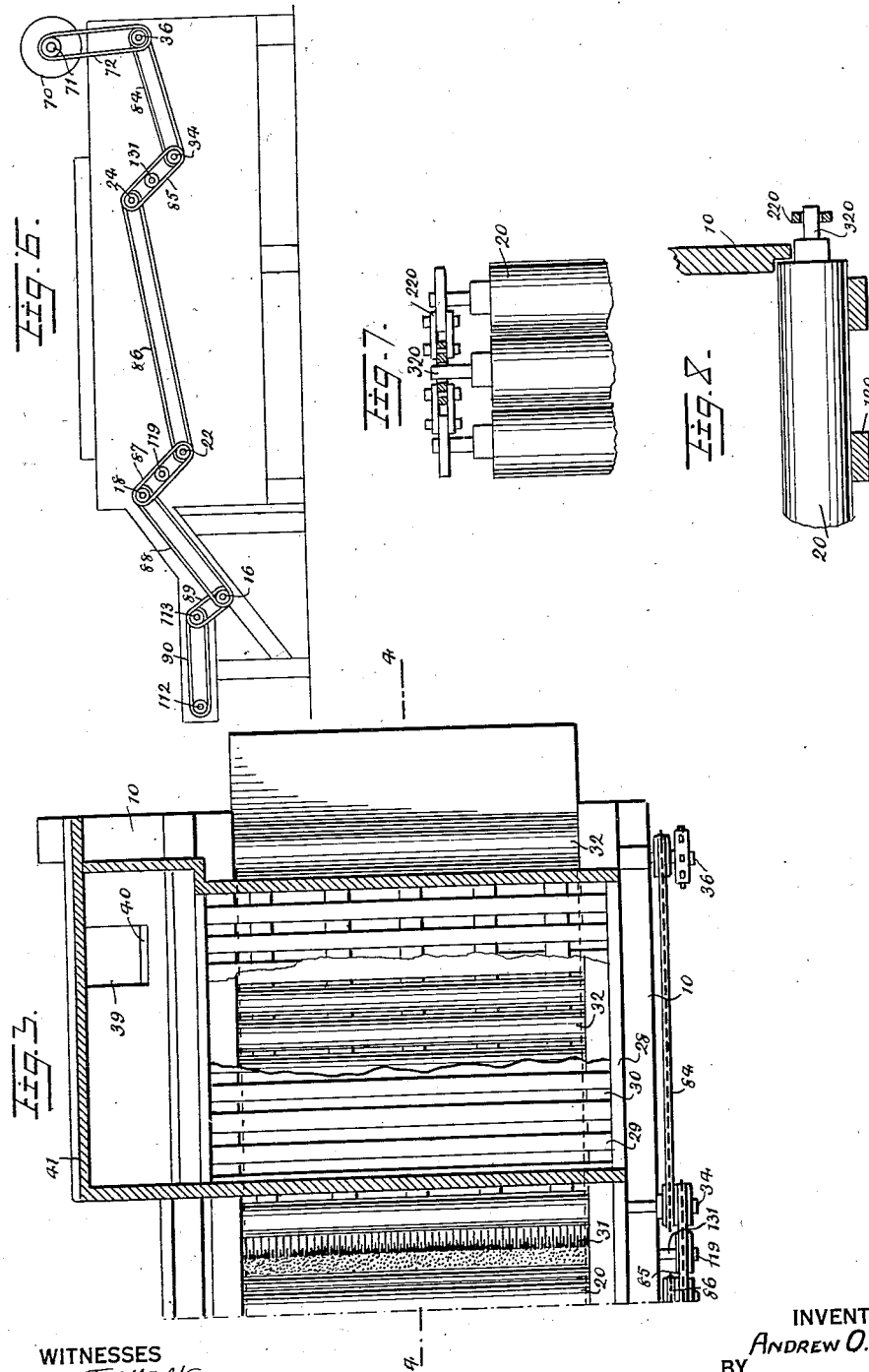

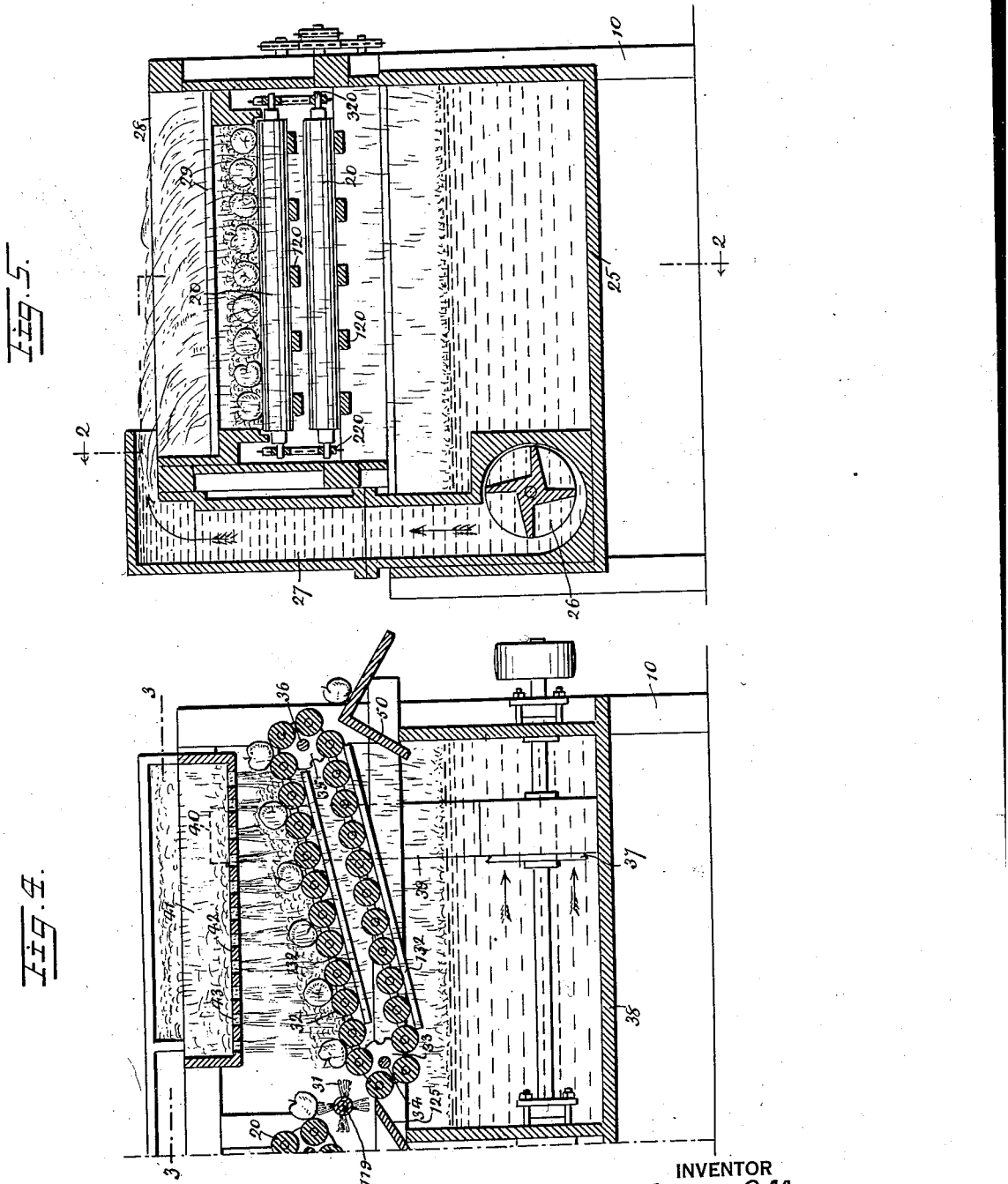

Patented Dec. 4, 1934

1,983,478

UNITED STATES PATENT OFFICE 1,983,478

METHOD OF AND APPARATUS FOR CLEANING FRUIT

Andrew O. Moe, Toppenish, Wash., assignor to Food Machinery Corporation, San Jose, Calif.

Original application March 24, 1928, Serial No. 264,286. Divided and this application July 23, 1929, Serial No. 380,391

7 Claims. (Cl. 146—194)

My invention relates to a method and apparatus for washing fruit, and rinsing the fruit after the application of the washing liquid to remove said liquid.

The general object of my invention is to provide a novel and effective means for washing and rinsing fruit, and so arranged that a weak solution of acid will be effective in the cleansing operation.

More particularly, my invention provides a washing apparatus to remove the spray residue from apples and the like, consisting of arsenate of lead, which is a poisonous substance and is sprayed on the fruit during the growing season for poisoning the larvæ of the codling moth. This spray residue is particularly difficult to remove, especially from apples picked late in the season as the cold weather brings out wax on the surface of the apples which causes the spray to adhere to the apples. The spray residue also becomes impregnated in the stem and calyx of the apples which cannot be removed by the so-called "spraying" method of washing the fruit or by frictionally engaging the fruit with brushes or wipers. Much of the fruit grown in this country is produced in sections in which there is very little rainfall, so that the fruit is not washed by rainfall during the growing season. Practically the entire spray residue therefore must be removed before the apples are in condition for marketing. The pure food regulations require that this spray residue be reduced to not less than .01 grain per pound of fruit in order that the fruit may be eaten without injury to the health.

The present invention provides an apparatus which gravitationally floods the fruit with an immense amount of hydrochloric acid solution which combines with the lead arsenic by chemical action, thereby reducing the poisonous spray residue to a soluble state. This apparatus is distinguished from the spray type of apparatus for cleaning fruit in that the acid washing solution cascades in such quantities on the fruit as it is moved on the conveyor that the fruit is moving in a bath of the solution. In the larger type of such machine which treats two to three hundred boxes of fruit per hour, several hundred gallons of such acid solution pours on to the fruit per minute. After the fruit is treatted by the acid solution it then passes through rinsing water which likewise cascades gravitationally upon the fruit in immense quantities so that the fruit is in a bath or flooded condition when in motion through the rinsing water. This rinsing water removes the acid solution from the surface of the fruit.

The quantity of acid solution and rinsing water will of course vary with the amount of residue on the fruit. Six to seven hundred gallons of acid solution per minute and two to three hundred gallons of rinsing water have produced good results on fruit heavily coated with spray residue. In all spray devices for removing spray residue from fruit or the like it has been found impossible to hold enough dissolving liquid in contact with the fruit to thoroughly adsorb the spray residue in the time possible with a continuously operating machine, and further that the very thin film of spray solvent actually in contact with the fruit did not have sufficient volume to quickly absorb the residue before reaching the saturation point with the inevitable result that the spray residue was not removed to the minimum required by law so that the fruit had to be handled again for additional treatment at great added expense. It was also found that the bombardment of the spray jets had a tendency to drive the spray residue into the blossom and stem ends of the fruit so that these very vital points were not properly treated and retained traces of spray residue, many times more than the permissible minimum. It was also found that the immersion method was not reliable either. Where a conveyor travels through a mass or body of liquid with the fruit it carries immersed in the liquid the conveyor and mass of fruit have a tendency to carry the body of liquid in the immediate zone of travel along with it so that not sufficient fresh solvent was applied to the fruit to wholly remove the undesirable residue.

Applicant discovered, after considerable experiment that by releasing a flood volume of liquid on top of the fruit while moving along with the conveyor that sufficient fresh solvent was applied to the fruit to quickly and completely absorb the spray residue and carry it away before the saturation point was reached, and further that he completely avoids the troubles encountered with the spray jet system and also with the immersion system.

The gravitational flood volume of liquid released on the fruit by the apparatus disclosed in this application immerses the fruit almost as completely as it is immersed in the tank system but the difficulty encountered in this system of carrying the immediate body of contact liquid along with the mass of fruit is entirely obviated, the flood of liquid flows so freely and rapidly that each fruit is subjected to just the proper immersion and the residue is absorbed in the minimum of time.

It will be observed that the application of the liquid to the fruit in flood streams as the fruit is conveyed along, results in continuously covering the fruit surfaces in a rapidly flowing flood-like coating of solution, forming a transitory bath which flows downwardly over the fruit surfaces to react with the spray residue, and by reason of its volume and rapidity of flow, the products of reaction are rapidly flushed away so as to insure intimate association between the remaining spray residue and the fresh solvent solution being applied to the fruit. Moreover it will be apparent that the mass of fruit, as well as the slightly spaced rollers of the conveyor form a partial barrier to the passage of liquid therethrough, and the resultant retardation of the flow of liquid causes more or less building up—depending upon the volume of liquid released from the overhead tank—of a temporarily suspended transitory bath of turbulent solution which assists the washing and flushing action of the deluging streams of falling solution.

This is a divisional application of my application Serial No. 264,286.

Reference is to be had to the accompanying drawings forming a part of this specification, it being understood that the drawings are merely illustrative of one example of the invention.

Figure 1 is a plan view of an apparatus embodying my invention, parts being broken away;

Figure 2 is a longitudinal vertical section of the left half of the machine, the section being taken on the line 2—2 indicated in Figure 5;

Figure 3 is a horizontal section on the line indicated by 3—3 in Figure 4;

Figure 4 is a longitudinal section of the right half of the machine the section being indicated by the line 4—4 of Figure 3;

Figure 5 is a transverse vertical section on the line 5—5 of Figure 2;

Figure 6 is a diagrammatic side elevation of the machine given to show one drive means that may be employed;

Figure 7 is a detail in plan view with parts broken out and sectioned, the view being given to show the drive chain and roller assemblage;

Figure 8 is a transverse vertical section of the parts shown in Figure 7.

In carrying out my invention in practice in accordance with the illustrated example, a suitable frame designated generally by the numeral 10 is constructed. At the feed end of the machine a conveyor means is provided, preferably an endless conveyor belt 11 running over pulleys 12 and 13 on shafts 112 and 113 respectively. The belt 11 delivers the fruit to an endless series of rollers 14 running over sprockets 15 and 17 mounted on shafts 16 and 17 respectively. The endless series of rollers 14 constitute an elevator from the top of which the fruit is discharged and advantageously to a transfer revolving brush 19 on a shaft 119.

A conveyor is provided in the shape of an endless series of rollers 20, to which conveyor the fruit is delivered by revolving transfer brush 19, said conveyor running at one end over a sprocket wheel 21 on a shaft 22, and at the other end over a sprocket wheel 23 on a shaft 24. The numeral 120 indicates supporting slats for both runs of the endless series of rollers 20. The numeral 125 indicates a deflector board disposed adjacent the top of the acid tank 25 near that end of the conveyor 20 opposite the receiving end, said deflector board extending beneath the brush 31 to deflect liquid dripping from said brush back to the tank 25.

Beneath said endless conveyor, made up of rollers 20 spaced quite closely in the illustrated example, is a tank 25 which in practice holds a weak solution of acid. From the outlet 127 of the upwardly extending discharge flume 27 of a pump 26 in tank 25 the acid solution from the tank 25 is delivered to an overhead distributing tank 28, the bottom of which is composed of slats 29 or equivalent openwork structure, to provide outlet discharge openings 30 for the downflow of the acid solution pumped from tank 25.

From the conveyor 20 the fruit is delivered after subjection to the cleansing acid or equivalent liquid to a washing assemblage. The fruit passes from the conveyor 20 to a transfer device in the form of a revolving brush 31, the fruit finally passing to the second conveyor 32 above a water tank 38 hereinafter more particularly referred to. The second conveyor comprises in practice an endless series of rollers 32 disposed on an incline. Said endless series of rollers pass about, at the lower end, a sprocket 33 on a shaft 34, and at the upper end about a sprocket 35 on a shaft 36. A pump 37 is provided in the water tank 38, the pumped washing water passing through the uptake flume 39 to the discharge outlet 40 of said flume from which the water flows into the overhead water distributing tank 41. The major area of the tank 41 permits the downflow of water therefrom, the arrangement in practice preferably consisting of slats 42 and intervening slots or openings 43.

The numeral 50 indicates an inclined water board disposed at the upper edge of the water tank 38 at one side and extends to a point to collect the water dripping from the fruit as it passes out of the apparatus and directs the same into the water tank 38.

With the described construction the fruit is placed manually or by any suitable feed means on the endless feed apron or belt 11 and from said belt is delivered upwardly by the conveyor 14 to the transfer revolving brush 19, from which the fruit falls to the lower end of the inclined endless conveyor 20 to be delivered to a second transfer revolving brush 31, and thence to the inclined conveyor 32 at the top of the water tank 38.

As the fruit is carried along the conveyor 20 the pump 26 discharges an acid solution or other cleansing liquid from the tank 25 to the tank 28, the cleansing liquid escaping through the openings 30 in the bottom of said tank 28 and is flooded gravitationally in large quantities on to the fruit carried along by the conveyor 20.

The fruit in being carried along by the conveyor 32 is subjected to the action of rinsing water from the tank 38 by reason of pump 37 discharging water to the tank 41 from which the washing or rinsing water is flooded gravitationally from the openings 43 on to the fruit on conveyor 32.

Any suitable drive mechanism may be adopted. For purposes of illustration I have indicated (see Figures 3 and 6) a drive pulley 70 on a drive shaft 71 extending transversely through the machine, as shown in cross section Figure 3. From a pulley on the shaft 71 is driven an endless drive chain 72 running to a sprocket pulley on the shaft 36.

Suitable drive elements run from said shaft 36 to the drive of the feed apron 11. A belt 84 is driven from a pulley on said shaft 36 and runs over a pulley on a shaft 34 driving said shaft 34, and a second pulley on shaft 34 drives a belt 85 running over a pulley on a shaft 24 for driving the latter. Also on the shaft 24 is a drive sprocket over which a belt 86 runs to a pulley on a shaft 22. From the pulley on the shaft 22 also runs a belt 87 which also runs over a pulley on a shaft 18, driving said shaft 18. A belt 88 runs from a driven pulley on the shaft 18 to a driven pulley on a shaft 16, and from a driven pulley on shaft 16 runs a belt 89 to a pulley on a shaft 113, and from a second pulley on shaft 113 runs a belt 90 to a pulley on the shaft 112 of apron 11.

The numeral 220 indicates a chain belt connecting the several conveyor belt rollers 20, the end extension 320 of each roller 20 running to a certain link of the chain 22.

By the described apparatus the cleaning of the fruit or vegetables is effected by unsprayed water, that is, by flooding as by causing the cleaning liquid to discharge gravitationally onto the fruit or vegetables in the manner illustrated. The expression "flooding of the water on to the fruit or vegetables" is here employed to distinguish from sprayed water or water from spray nozzles, and may be effected by any suitable means such as a tank with outlet openings in the bottom. It will be understood that a tank with an open bottom or equivalent means may be produced in any suitable manner, as by slotting, perforations or spaced slats and that the material of the tank may be varied.

It will be understood of course that the solution discharged from the distributing tank 28 is a weak solution of hydrochloric acid which removes the spray residue on the fruit by dissolving the same. To accomplish this end, the amount of the acid solution will of course depend upon the amount of residue on the fruit. When the fruit is heavily coated with spray residue, six to seven hundred gallons of acid solution per minute has been effective in removing the spray residue to meet the requirements of the pure food authorities, and two to three hundred gallons of rinsing water discharging from the water distributing tank 41 has been effective in washing the acid solution from the fruit.

I would state furthermore that while the illustrated example constitutes a practical embodiment of my invention, I do not limit myself strictly to the exact details herein illustrated, since, manifestly, the same can be considerably varied and the method carried out by other apparatus without departure from the spirit of the invention.

I claim:

1. The method of treating fruit or the like to remove spray residue therefrom consisting in moving a quantity of distributed fruit along a predetermined pathway and turning each fruit axially to expose all surfaces thereof, applying spray residue dissolving liquid onto said fruit in gravitational flood volume to build up a depth of liquid so that each fruit is substantially immersed in a body of flowing liquid so the spray residue can be dissolved and flushed away by the liquid without approaching the saturation point, then continuing the movement of the said fruit and applying washing liquid onto said fruit in gravitational flood volume to remove the spray solvent therefrom.

2. The method of treating fruit or the like to remove spray residue therefrom consisting in moving a mass of distributed fruit along a predetermined pathway and turning each fruit through a plurality of axes during its travel to expose all surfaces thereof, applying a flood volume of spray dissolving liquid onto the said moving fruit in quantity sufficient to build up a body to fully immerse the fruit as it flows thereover whereby the adhering spray on the fruit will be absorbed by a flowing flood of liquid without approaching the saturation point, and then applying wash water to remove the spray solvent.

3. The method of treating fruit or the like to remove spray residue therefrom consisting in moving a quantity of distributed fruit along a predetermined pathway and turning each fruit through a plurality of axes during its travel to expose all surfaces thereof, dropping spray residue dissolving liquid onto said fruit in flood volume to substantially envelope the pieces of fruit and flow thereover and therebetween so the fruit surfaces are substantially covered with the flowing liquid whereby the spray residue is dissolved and flushed away without the liquid reaching the saturation point, then continuing the movement of the fruit and dropping wash water onto the fruit to remove the spray solvent.

4. The method of treating spray residue covered fruit to remove adhering spray residue therefrom, consisting in moving a distributed quantity of fruit along a predetermined pathway and rolling each fruit during its travel to expose various surfaces thereof, applying a flood volume of spray residue dissolving liquid under substantially gravity head onto the moving fruit in quantities sufficient to build up a turbulent layer of liquid to envelope the fruit as it flows thereover in a transitory bath of liquid whereby the adhering spray residue on the fruit will be dissolved and flushed away by a flowing flood of liquid without approaching the saturation point of said liquid, and then applying wash water to remove the spray solvent.

5. The method of treating fruit or the like to remove adhering spray residue therefrom which comprises moving a quantity of distributed fruit over a predetermined pathway and rolling the same to expose various surfaces thereof, discharging a spray residue solvent solution in flood streams under substantially gravity head downwardly onto the fruit at such rate and in such large volumes as to continuously flood the fruit in a turbulent enveloping bath of downwardly rushing solvent solution in such volume as to prevent the adherence to the fruit surfaces of films of solution containing the products of reaction produced between the spray residue and the solution tending to retard further removal of the spray residue from the fruit and then rinsing said solvent solution from the fruit.

6. In a method of treating apples to remove adhering spray residue therefrom, the steps of moving a quantity of such fruit along a path for treatment and turning the fruit over and over to repeatedly expose various surfaces thereof, simultaneously directing flood streams of a chemical spray residue solvent and flushing solution under substantially gravity head downwardly onto the fruit in such large volumes as to continuously cover the fruit surfaces with a floodlike enveloping transitory bath of rapidly flowing solution to flow thereover and downwardly therepast to react with the spray residue and rapidly flush away the products of reaction so as to prevent the adherence to the fruit surfaces of films of solution containing the products of reaction produced between the spray residue and the solution and insure intimate association between the remaining spray residue and the fresh solvent solution being applied to the fruit.

7. In a method of treating apples to remove adhering spray residue therefrom, the steps of moving a quantity of such fruit along a path for treatment and turning the fruit over and over to repeatedly expose various surfaces thereof, simultaneously directing a spray residue solvent and flushing solution onto the fruit in flood streams so as to flow over the fruit surfaces and form a temporarily suspended turbulent bath of rapidly flowing solution around the pieces of fruit and flowing downwardly therebetween to react with the spray residue and rapidly flush away the products of reaction so as to insure intimate association between the remaining spray residue and the fresh solvent solution being applied to the fruit.

ANDREW O. MOE.